US009607634B2

(12) United States Patent
Deen et al.

(10) Patent No.: US 9,607,634 B2
(45) Date of Patent: Mar. 28, 2017

(54) MAGNETIC STACK INCLUDING COOLING ELEMENT

(71) Applicant: SEAGATE TECHNOLOGY LLC, Cupertino, CA (US)

(72) Inventors: David Deen, Edina, MN (US); Eric Singleton, Maple Plain, MN (US); Vasudevan Ramaswamy, Edina, MN (US); Mohammed Patwari, Edina, MN (US); Taras Pokhil, Arden Hills, MN (US); Jae-Young Li, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/045,563

(22) Filed: Feb. 17, 2016

(65) Prior Publication Data

US 2016/0163337 A1 Jun. 9, 2016

Related U.S. Application Data

(62) Division of application No. 14/319,195, filed on Jun. 30, 2014, now Pat. No. 9,269,379.

(51) Int. Cl.
| | |
|---|---|
| G11B 5/31 | (2006.01) |
| G11B 5/39 | (2006.01) |
| G11B 5/40 | (2006.01) |
| G11B 5/60 | (2006.01) |
| G11B 5/11 | (2006.01) |
| G11B 5/09 | (2006.01) |
| G11B 5/115 | (2006.01) |

(52) U.S. Cl.
CPC ............ *G11B 5/314* (2013.01); *G11B 5/09* (2013.01); *G11B 5/11* (2013.01); *G11B 5/115* (2013.01); *G11B 5/398* (2013.01); *G11B 5/3912* (2013.01); *G11B 5/40* (2013.01); *G11B 5/607* (2013.01)

(58) Field of Classification Search
None
See application file for complete search history.

(56) References Cited

U.S. PATENT DOCUMENTS

| | | |
|---|---|---|
| 5,965,840 A | 10/1999 | Nagarajan |
| 6,987,650 B2 | 1/2006 | Liu |
| 7,382,584 B2 | 6/2008 | Liu |
| 7,556,869 B2 | 7/2009 | Fukushima |
| 7,869,154 B2 | 1/2011 | Kudo |
| 7,957,093 B2 | 6/2011 | Brand |

(Continued)

*Primary Examiner* — Paul Huber
(74) *Attorney, Agent, or Firm* — Mueting, Raasch & Gebhardt, P.A.

(57) ABSTRACT

Various embodiments of a magnetic stack are disclosed. In one or more embodiments, the magnetic stack includes first and second shield layers, and a magnetically responsive lamination disposed between the first and second shield layers. The magnetically responsive lamination can be configured to receive a sense current $I_S$ therethrough. The magnetic stack also includes a cooling element disposed between the first and second shield layers and thermally coupled to the magnetically responsive lamination. The cooling element can be configured to receive a bias current $I_B$ therethrough. And the cooling element can be configured to cool the magnetically responsive lamination during a read function.

17 Claims, 5 Drawing Sheets

(56) References Cited

U.S. PATENT DOCUMENTS

| | | |
|---|---|---|
| 8,031,435 B2 | 10/2011 | Ambrose |
| 8,089,132 B2 | 1/2012 | Zheng |
| 8,345,389 B2 | 1/2013 | Yuasa |
| 2002/0034054 A1 | 3/2002 | Michel |
| 2005/0111142 A1 | 5/2005 | Oshima |
| 2011/0194335 A1 | 8/2011 | Zheng |
| 2012/0276415 A1 | 11/2012 | Sapozhnikov |

MAGNETIC STACK INCLUDING COOLING ELEMENT

CROSS REFERENCE TO RELATED APPLICATION

This application is a divisional application of U.S. application Ser. No. 14/319,195, filed Jun. 30, 2014, the disclosure of which is incorporated herein by reference thereto.

SUMMARY

In general, the present disclosure provides various embodiments of a magnetic stack that includes one or more cooling elements and a method of using the stack.

In one aspect, the present disclosure provides one embodiment of a magnetic stack that includes first and second shield layers, and a magnetically responsive lamination disposed between the first and second shield layers. The magnetically responsive lamination is configured to receive a sense current $I_S$ therethrough. The magnetic stack also includes a cooling element disposed between the first and second shield layers and thermally coupled to the magnetically responsive lamination. The cooling element is configured to receive a bias current $I_B$ therethrough. And the cooling element is configured to cool the magnetically responsive lamination during a read function.

In another aspect, the present disclosure provides another embodiment of a magnetic stack that includes first and second shield layers, and a magnetically responsive lamination disposed between the first and second shield layers. The magnetically responsive lamination is configured to receive a sense current $I_S$ therethrough. The magnetic stack also includes an array of cooling elements thermally coupled to the magnetically responsive lamination. The array of cooling elements is configured to receive a bias current $I_B$ therethrough. And the array of cooling elements is configured to cool the magnetically responsive lamination.

In another aspect, the present disclosure provides one embodiment of a method that includes reading a selected data pattern from a storage medium of a storage device using a head of the storage device to provide a data signal; calculating an instability value of the head based on the data signal; and applying a bias current $I_B$ to a cooling element thermally coupled to the head if the instability value is greater than an instability threshold, where the cooling element is disposed between first and second shield layers of the head.

These and other aspects of the present disclosure will be apparent from the detailed description herein. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure provides various embodiments of a magnetic stack that can include one or more cooling elements and a method of using the stack.

Electronic devices, e.g., solid-state devices, can be affected by thermal fluctuations or increased temperatures. For example, read/write heads utilized in data storage devices can experience performance degradation under elevated temperatures that can occur during normal operation. In such devices, various elements and techniques can be utilized to mitigate this thermal degradation.

For example, one or more embodiments of magnetic stacks of the present disclosure can include a cooling element that can reduce the temperature in one or more portions of the magnetic head. Such cooling can help mitigate thermal instability of the head. Further, in one or more embodiments, the cooling element can be actively controlled to provide cooling during any suitable function of the magnetic stack, e.g., one or both of a read function and a write function.

Heads can include one or more heaters that can control a fly height between the head and a storage medium. For example, a heater associated with a read element of a head can be used to change the fly height between the read element and the storage medium. Such a heater, however, can cause elevated temperatures in and around the read element. Further, heating of the head can be caused by power losses from conduction current driven by a sense current that is provided through the head for creating a signal from the head. Subsequently, performance degradation during operation at elevated temperatures can be caused by both of these mechanisms or other mechanisms as well. Such degradation can include side-shield free layer magnetic bias, thermally promoted grain switching of one or both of synthetic antiferromagnetic (SAF) layers and antiferromagnetic (AFM) layers, thermally promoted grain switching near defects in shields, and associated noise increases leading to reduced signal-to-noise ratio (SNR).

In general, the present disclosure provides one or more embodiments of a magnetic stack and devices that include such magnetic stacks, e.g., data storage devices. In one or more embodiments, the magnetic stack can include first and second shield layers; a magnetically responsive lamination disposed between the first and second shield layers; and a cooling element disposed between the first and second shield layers and thermally coupled to the magnetically responsive lamination. The cooling element can be configured to cool the magnetically responsive lamination.

Figure 1:
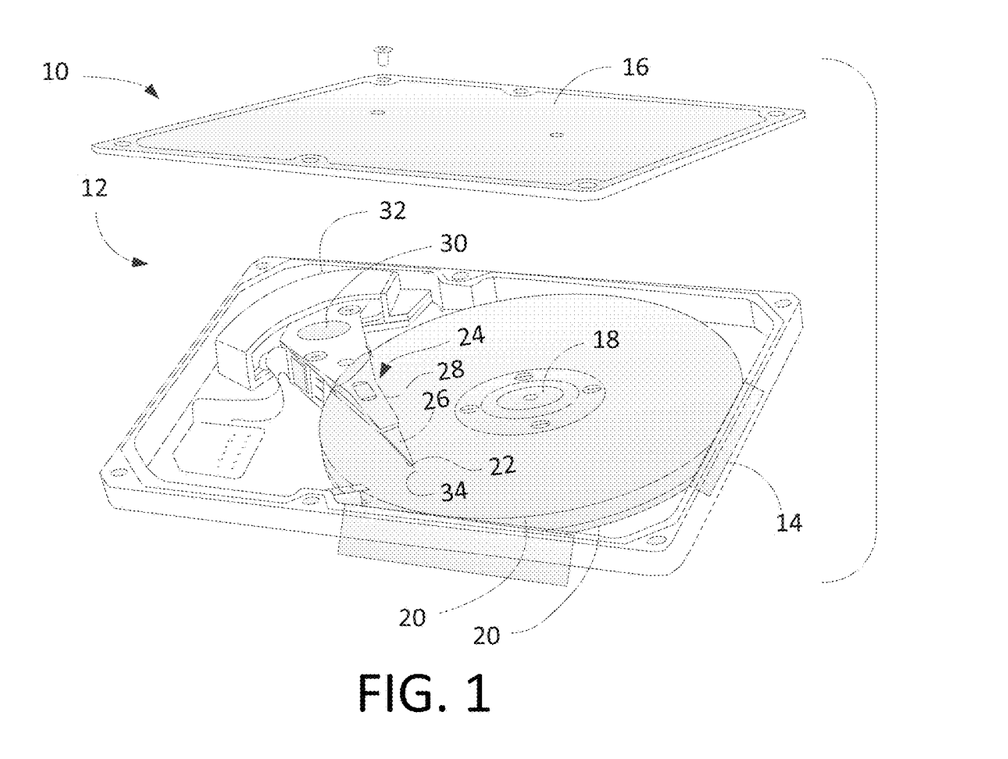
FIG. 1 is a schematic perspective view of one embodiment of a data storage device.

An example of a data storage device 10 is provided in FIG. 1. The device 10 shows a non-limiting environment in which various embodiments of the present disclosure can be practiced. The device 10 includes a substantially sealed housing 12 formed from a base deck 14 and top cover 16. An internally disposed spindle motor 18 is configured to rotate one or more of magnetic storage media 20. The media 20 are accessed by a corresponding array of data transducers (read/write heads) that are each supported by a head gimbal assembly (HGA) 22.

Each HGA 22 can be supported by a head-stack assembly 24 ("actuator") that includes a flexible suspension 26, which in turn is supported by a rigid actuator arm 28. The actuator 24 preferably pivots about a cartridge bearing assembly 30 through application of current to a voice coil motor (VCM) 32. In this way, controlled operation of the VCM 32 causes the transducers (numerically denoted at 34) or head to align with tracks (not shown) defined on the media surfaces to store data thereto or retrieve data therefrom.

Figure 2:
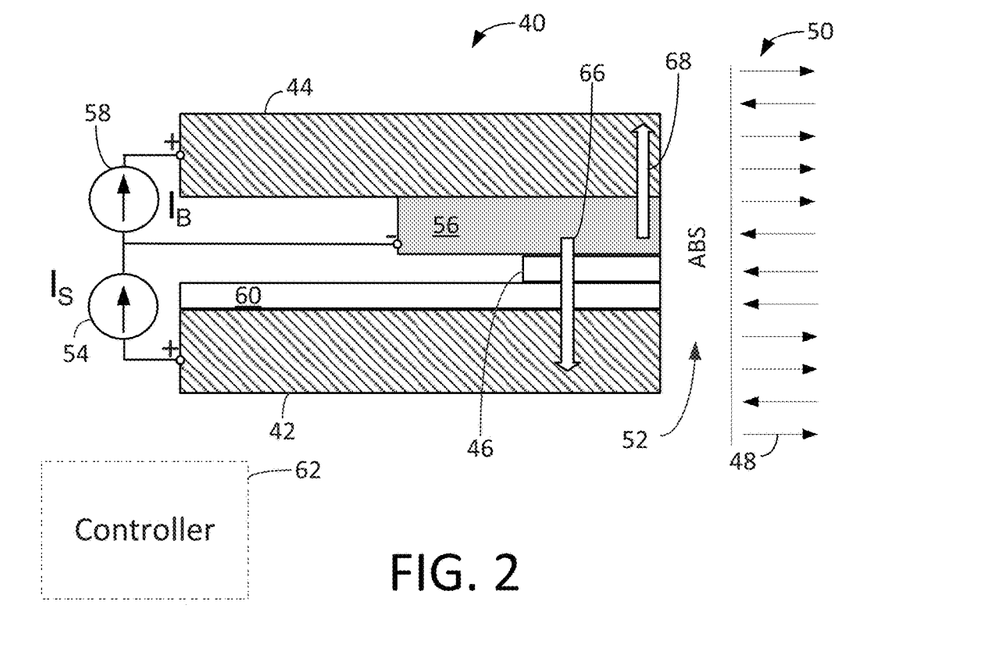
FIG. 2 is a schematic cross-section view of one embodiment of a magnetic stack.

FIG. 2 is a schematic cross-section view of one embodiment of a magnetic stack 40 capable of being used, e.g., as a read element or sensor in the data transducers 34 of FIG. 1. As illustrated, the magnetic stack 40 includes a first shield layer 42 and a second shield layer 44, and a magnetically responsive lamination 46 disposed between the first and second shield layers. The magnetically responsive lamination 46 can, in one or more embodiments, be separated from a sensed data bit 48 stored in an adjacent medium 50 by an air bearing surface 52 (ABS). The stack 40 also includes a cooling element 56 disposed between the first and second shield layers 42, 44.

The first and second shield layers 42, 44 can each include any suitable material or combination of materials. In one or more embodiments, at least one of the first and second shield layers 42, 44 can include any suitable material or combination of materials such that the shield layers shield the magnetically responsive lamination 46 from stray magnetic fields, e.g., NiFe, CoNiFe, etc. In one or more embodiments, the first shield layer 42 and second shield layer 44 can include the same materials; in other embodiments, the first shield layer includes material or materials that are different from the material or materials of the second shield layer. Further, the first and second shield layers 42, 44 can take any suitable shape or combination of shapes and have any suitable dimensions. Shielding by the first and second shield layers 42, 44 can allow for improved magnetic sensing of programmed bits 48 from medium 50 by eliminating noise and inadvertent sensing of adjacent bits.

Disposed between the first and second shield layers 42, 44 is the magnetically responsive lamination 46. Although referred to as a lamination, the magnetically responsive lamination 46 can be formed using any suitable technique or combination of techniques. In one or more embodiments, the magnetically responsive lamination 46 is configured to receive a sense current $I_S$ 66 therethrough as is further described herein.

Figure 3:
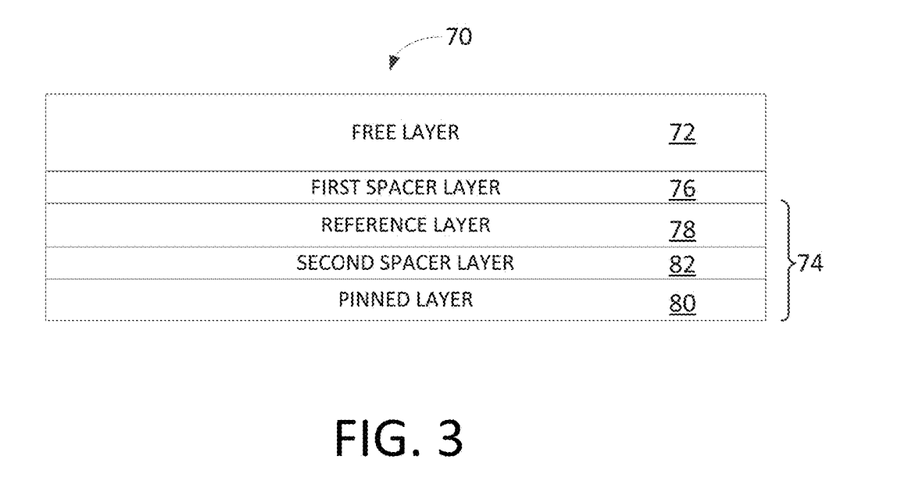
FIG. 3 is a schematic cross-section view of one embodiment of a magnetically responsive lamination.

The lamination 46 can include any suitable construction such that, in one or more embodiments, the lamination is capable of being used as a read element or sensor in a head of a data storage device (e.g., device 10 of FIG. 1). For example, FIG. 3 is a schematic cross-section view of one embodiment of a magnetically responsive lamination 70. The magnetically responsive lamination 70 includes a ferromagnetic free layer 72, a synthetic antiferromagnetic (SAF) structure 74, and a first spacer layer 76 positioned between the free layer and the SAF structure. In one or more embodiments, the magnetically responsive lamination 70 can include any suitable layer or layers.

In the illustrated embodiment, the magnetically responsive lamination 70 includes the free layer 72 that can be sensitive to external magnetic fields. That is, the free layer 72 can have a magnetization that corresponds to an encountered external magnetic field, such as provided by programmed sensed data bits 48 on the adjacent storage medium 50 (as illustrated in FIG. 2). The free layer 72 can include any suitable material or combination of materials, e.g., NiFe, CoFe, CoNiFe, CoFeB, magnetic Heusler alloys, etc.

The SAF structure 74 of the lamination 70 is separated from the free layer 72 by the first spacer layer 76. The SAF structure 74 can have a predetermined set magnetization. In the embodiment illustrated in FIG. 3, the SAF structure 74 includes a reference layer 78, and a non-magnetic second spacer layer 82 positioned between the reference layer and a pinned layer 80. In other embodiments, the SAF structure 74 can include any suitable layer or layers. For example, the SAF structure 74 can include a lamination of a transition metal, such as Ru, disposed between ferromagnetic crystalline or amorphous sub-layers, such as metals like Ni and Co, alloys like CoFe and NiFe, and high polarization ratio compounds like CoFeB. The reference layer 78 can include any suitable material or combination of materials, e.g., CoFe, CoFeB, etc.

The second spacer layer 82 can include any suitable material or combination of materials, e.g., Ru, and can have any suitable thickness to accommodate free layer magnetic sensing.

The free layer 72 and SAF structure 74 can each be coupled to an electrode layer, e.g., one or more seed layers, cap layers, etc., that provide both manufacturing and operational improvements. It should be noted, however, that the composition, shape, and placement of the electrode layers are not limited and can be modified or removed.

The pinned layer 80 is positioned between the second spacer layer 82 and an optional AFM structure (e.g., AFM structure 60 of FIG. 2). In one or more embodiments, the pinned layer 80 is coupled to the AFM structure. Further, in one or more embodiments, the pinned layer 80 can be coupled to a shield layer (e.g., first shield layer 42 of FIG. 2). The pinned layer 80 can include any suitable material or combination of materials, e.g., Co, CoFe, CoFeB, etc.

Positioned between the free layer 72 and the SAF structure 74 is the first spacer layer 76. The first spacer layer 76 can include any suitable material or combination of materials, e.g., Co, Ag, MgO, TiO, $Al_2O_3$, etc. In one or more embodiments, the first spacer layer 76 can include the same material as the second spacer layer 82.

Returning to FIG. 2, the stack 40 can include a current source 54 that is configured to provide the sense current $I_S$ 66 through the magnetically responsive lamination 46. The current source 54 can include any suitable circuitry or devices to provide sense current $I_S$. Further, the current source 54 can be electrically coupled to any suitable element of the stack 40 to provide sense current $I_S$ to the lamination 46. For example, in the embodiment illustrated in FIG. 2, the current source 54 is electrically coupled to the first shield layer 42 and the cooling element 56. In one or more alternative embodiments, the current source 54 can be electrically coupled to AFM layer 60 and the cooling element 56. In one or more alternative embodiments, the stack 40 can include any suitable additional layer or layers that are electrically coupled to the current source 54 to provide sense current $I_S$ through the lamination 46. The sense current $I_S$ can be directed through the magnetically responsive lamination 46 and magnetic flux can be detected by measuring the change in voltage across the lamination 46 as a function of changing resistivity.

Further, the current source 54 can be oriented in any suitable manner. For example, as illustrated, the positive side of the current source 54 can be electrically coupled to the first shield layer 42, and the negative side of the current source can be electrically coupled to the cooling element 56. Alternatively, in one or more embodiments, the positive side of the current source 54 can be electrically coupled to the cooling element 56, and the negative side of the current source can be electrically coupled to the first shield layer 42.

Also disposed between the first and second shield layers 42, 44 is the cooling element 56. Although depicted as including one cooling element 56, the magnetic stack 40 can include any suitable number of cooling elements as is further described herein. In one or more embodiments, the cooling element 56 is thermally coupled to the magnetically responsive lamination 46. Further, in one or more embodiments, the cooling element 56 can also be thermally coupled to the second shield layer 44.

The cooling element 56 can be disposed in any suitable location. For example, in one or more embodiments, the cooling element 56 can be disposed between the magnetically responsive lamination 46 and the first shield layer 42. In one or more alternative embodiments, the cooling element 56 can be disposed between the magnetically responsive lamination 46 and the second shield layer 44 as is illustrated in FIG. 2. In one or more alternative embodiments, the cooling element 56 can be disposed next to or beside the magnetically responsive lamination 46 such that the lamination 46 is between the cooling element and the ABS 52. As is further described herein, in one or more embodiments, insulating material can be disposed between the cooling element 56 and the ABS 52. In one or more alternative embodiments, the cooling element 56 can be disposed proximate the magnetically responsive lamination 46. As used herein, the phrase "proximate the magnetically responsive lamination" means that the cooling element 56 is positioned such that it is thermally coupled to the magnetically responsive lamination 46. Although not shown, the cooling element 56 can be electrically isolated from the rest of the stack 40 using any suitable insulating material.

In one or more embodiments, the cooling element 56 can be disposed such that it is in contact with the magnetically responsive lamination 46. In one or more alternative embodiments, one or more layers can be disposed between the cooling element 56 and the magnetically responsive lamination 46.

The cooling element 56 can include any suitable construction such that it is operable to reduce the temperature of (i.e., cool) the magnetically responsive lamination 46 and/or a head of a storage device. In one or more embodiments, the cooling element 56 can include a Peltier cooling element. A Peltier cooling element is a device or structure that utilizes the Peltier Effect, which occurs when an electrical current is sent through two dissimilar materials that are physically or electrically connected to one another at one or more junctions. One junction between the two materials becomes warm while the other becomes cool in what amounts to an electrically driven transfer of heat from one side of the device to the other. The Peltier heat generated at the junction per unit time, $\dot{Q}$, is equal to $$\dot{Q}=(\Pi_A-\Pi_B)I$$

where $\Pi_A(\Pi_B)$ is the Peltier coefficient of conductor A(B), and I is the electric current (from A to B). The Peltier coefficients represent how much heat is carried per unit charge. A typical Peltier cooling element can include multiple junctions in series through which a current is driven. Some of the junctions lose heat due to the Peltier effect, while others gain heat.

Figure 4:
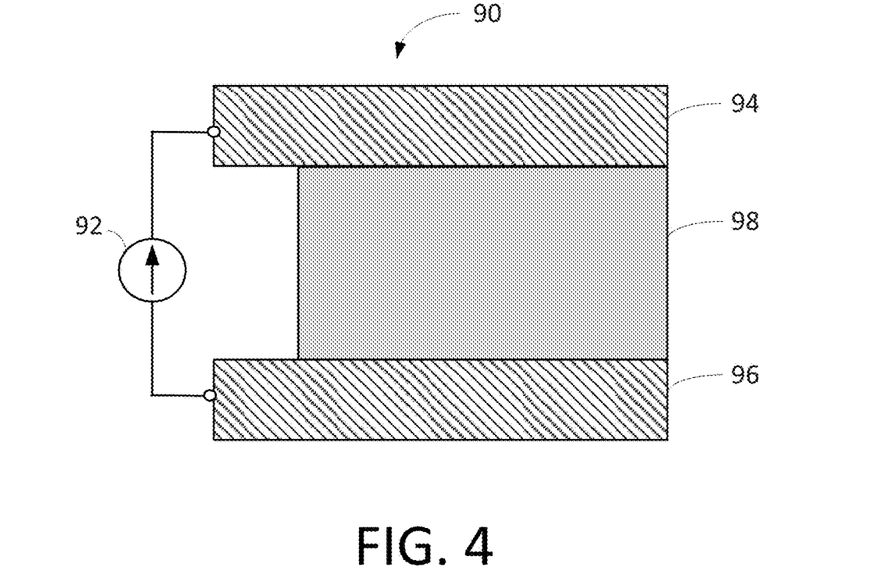
FIG. 4 is a schematic cross-section view of one embodiment of a cooling element.

For example, FIG. 4 is a schematic cross-section view of one embodiment of a Peltier cooling element 90. The cooling element 90 includes first and second materials 94, 96. The first and second materials 94, 96 are separated by a third material 98. A current source 92 is electrically coupled to the first and second materials 94, 96 to supply current to the element 90.

The materials used for the first, second, and third materials 94, 96, 98 are, in one or more embodiments, different conducting materials having different electron densities. When an electrical conductor connects first, second, and third materials 94, 96, 98 to each other, a new equilibrium of free electrons will be established. Potential migration creates an electrical field across each of the connections. When current is subsequently forced through the element 90, the attempt to maintain the new equilibrium causes the electrons at one connection to absorb energy and those at the other connection to release energy. The greater the difference between Seebeck coefficients of the first, second, and third materials 94, 96, 98 at each of the junctions between the three materials, the greater the Peltier effect and thus, the device 90 can provide greater cooling. This results in a cool end or side and a hot end or side of the device 90.

The first, second, and third materials 94, 96, 98 can include any suitable material or combination of materials. For example, in one or more embodiments, at least one of the first, second, and third materials 94, 96, 98 can include metals and/or semiconductor materials. The use of metals allow for processing convenience at a lower Seebeck coefficient ($\Pi=TS$, where S is the Seebeck coefficient, $\Pi$ is the Peltier coefficient, and T is the temperature), whereas the use of semiconductors provides higher Seebeck coefficients and, therefore, higher cooling capacity. Table I includes exemplary materials and their corresponding Seebeck coefficients.

TABLE 1

| Material | Seebeck Coefficient (uV/K) |
|---|---|
| Metal | |
| Antimony | 47 |
| Nichrome | 25 |
| Molybdenum | 10 |
| Tungsten | 7.5 |
| Gold | 6.5 |
| Silver | 6.5 |
| Copper | 6.5 |
| Tantalum | 4.5 |
| Aluminum | 3.5 |
| Platinum | 0 (reference) |
| Nickel | −15 |
| Semiconductor | |
| Se | 900 |
| Te | 500 |
| Si | 440 |
| Si (B-doped) | 1266 |
| Si (Ar-doped) | −1333 |
| Ge | 300 |
| GaN | 300 |
| PbTe | −180 |
| GaAs | ∼−500 |
| Dichalcogenides | |
| Carbon (graphene, 2D) | $100-10^4$ |
| $MoS_2$ (2D) | $>-10^5$ |
| $WS_2$ (2D) | 500-600 |
| WSe (2D) | ∼600 |
| $MoSe_2$ (2D) | 0-200 |
| Hensler Alloys | |

TABLE 1-continued

| Material | Seebeck Coefficient (uV/K) |
|---|---|
| $Co_2TiAl$ | −55 |
| $Co_2TiSi$ | −27 |
| $Co_2TiGe$ | −22 |
| $Co_2TiSn$ | −34 |
| $Co_2MnAl$ | −4 |
| $Co_2MnSi$ | −7 |
| $Co_2MnGe$ | −15 |
| $Co_2MnSn$ | −33 |
| $Co_2FeSi$ | −12 |

In one or more embodiments, at least one of the first, second, and third materials 94, 96, 98 can include a Huesler alloy, e.g., alloys having a chemical formula of $A_2BC$, where A includes Co, Ir, Rh, Pt, Cu, Ni, Pd, and combinations thereof, B includes V, Cr, Mn, Fe, and Ti, and C includes Al, Si, Ga, Sn, and Ge. Exemplary Huesler alloys include those listed in Table 1. In one or more embodiments, one or more of the first, second, and third materials 94, 96, 98 can include a combination of two or more Heusler alloys.

In one or more embodiments, the first, second, and third materials 94, 96, and 98 can be selected to provide desired magnetic properties of the cooling element 90 when the element 90 is included in a magnetic stack, e.g., stack 40 of FIG. 2.

Returning to FIG. 2, the cooling element 56, in one or more embodiments, can be configured to receive a bias current $I_B$ 68 therethrough. The bias current 68 can be provided to the cooling element 56 such that the element can cool the magnetically responsive lamination 46 as is further described herein.

In one or more embodiments, the bias current $I_B$ can be equal to the sense current $I_S$. In one or more alternative embodiments, the bias current $I_B$ can be different from the sense current $I_S$. In one or more embodiments, cooling element 56 can be controlled independently from the magnetically responsive lamination 46. In other words, the bias current $I_B$ can be controlled independently from the sense current $I_S$. The bias current $I_B$ can be any suitable current. In one or more embodiments, the bias current $I_B$ can be greater than 0 amps. In one or more embodiments, the bias current $I_B$ can be less than 1 amp.

As illustrated in FIG. 2, the bias current $I_B$ 68 can be provided by current source 58. Any suitable circuitry or devices can be utilized as current source 58. The current source 58 can be electrically coupled to the cooling element 56 in any suitable manner such that the bias current $I_B$ can be provided through the cooling element. For example, in the embodiment illustrated in FIG. 2, the current source 58 is electrically coupled to the second shield layer 44 and the cooling element 56, and the second shield layer is electrically coupled to the cooling element such that the bias current $I_B$ can be directed through the cooling element. In one or more alternative embodiments, the current source 58 can be electrically coupled directly to the cooling element 56 and not the second shield layer 44.

Further, the current source 58 can be configured such that it provides current to the cooling element 56 in any suitable orientation. For example, as illustrated in FIG. 2, the positive side of the current source 58 is electrically coupled to the second shield layer 44, and the negative side of the current source is electrically coupled to the cooling element 56. In one or more alternative embodiments, the positive side of the current source 58 can be electrically coupled to the cooling element 56, and the negative side of the current source can be electrically coupled to the second shield layer 44.

The cooling element 56 can be configured to reduce the temperature of (i.e., cool) the magnetically responsive lamination 46 during any function or cycle of a storage device. In one or more embodiments, the cooling element 56 can be configured to cool the magnetically responsive lamination 46 during a read function when the lamination is being utilized to sense data stored in medium 50. During read functions, a temperature of the lamination 46 can increase as the sense current $I_S$ 66 is directed through the lamination. Further, during read functions, a heater associated with the lamination 46 can increase a temperature of a portion of the stack 40 near or proximate the lamination 46 to reduce the fly height between the stack and the magnetic medium 50. Cooling the lamination 46 during the read function when power to the heater associated with the lamination is increased can, in one or more embodiments, reduce thermal instability of the lamination.

In one or more embodiments, the cooling element 56 is configured to cool the magnetically responsive lamination 46 during a write function of the storage device. And in one or more embodiments, the cooling element 56 is configured to cool the magnetically responsive lamination 46 during both a read function and a write function of the storage device. Further, in one or more embodiments, the cooling element 56 can be configured to cool the magnetically responsive lamination 46 between read and write functions.

The magnetic stack 40 can also include a controller 62 operably coupled to the stack. In one or more embodiments, the controller 62 is operable to control the bias current $I_B$ 68. In one or more embodiments, the controller 32 can also be utilized to control the sense current $I_S$. Any suitable controller or controllers can be utilized to control one or both of the bias current $I_B$ and the sense current $I_S$.

The methods, techniques, and/or processes described in this disclosure, including those attributed to the controller, or various constituent components, may be implemented, at least in part, in hardware, software, firmware, or any combination thereof. For example, various aspects of the techniques may be implemented within one or more controllers, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

The magnetic stack 40 can also include an optional AFM structure 60 disposed in any suitable location between the first and second shield layers 42, 44. In the illustrated embodiment, the AFM structure 60 is positioned between the magnetically responsive lamination 46 and the first shield layer 42. The AFM structure 60 can include any suitable layer or layers having any suitable material or materials. For example, in one or more embodiments, the AFM structure 60 can include an AFM layer, a first seed layer, and a second seed layer positioned between the AFM layer and the first seed layer. In one or more embodiments, such an AFM layer can be coupled to the pinned layer of an SAF structure (e.g., pinned layer 80 of SAF structure 74 of FIG. 3).

Figure 5:
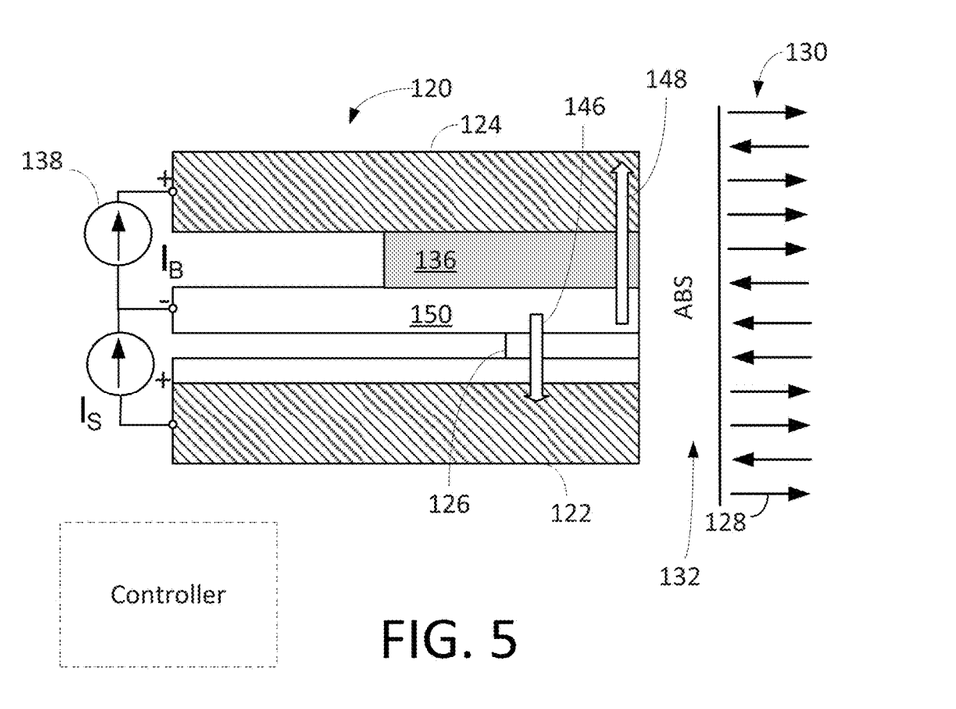
FIG. 5 is a schematic cross-section view of another embodiment of a magnetic stack.

In one or more embodiments, the magnetic stack 40 can include one or more additional layers that provide various functions. For example, FIG. 5 is a schematic cross-section view of one embodiment of a magnetic stack 120 that includes third shield layer 150. All of the design considerations and possibilities regarding the magnetic stack 40 of FIG. 2 apply equally to the magnetic stack 120 of FIG. 5.

The magnetic stack 120 includes first and second shield layers 122, 124, and a magnetically responsive lamination 126 disposed between the first and second shield layers. In one or more embodiments, the magnetically responsive lamination 126 is separated from a sensed data bit 128 stored in an adjacent medium 130 by an ABS 132. The magnetically responsive lamination 126 is configured to receive a sense current $I_S$ 146 therethrough.

The stack 120 also includes a cooling element 136 disposed between the first and second shield layers 122, 124. In one or more embodiments, the cooling element 136 is thermally coupled to the magnetically responsive lamination 126. Further, in one or more embodiments, the cooling element 136 is configured to receive a bias current $I_B$ 148 therethrough. And in one or more embodiments, the cooling element 136 is configured to cool the magnetically responsive lamination 126 during any suitable function or cycle of a magnetic storage device, e.g., during a read function.

As illustrated in FIG. 5, the third shield layer 150 is disposed such that the cooling element 136 is between the third shield layer and the second shield layer 124, where the third shield layer is magnetically coupled to the second shield layer and electrically coupled to the cooling element. The third shield layer 150 can include any suitable material or combination of materials, e.g., the same material or materials described in reference to first and second shield layers 42, 44 of stack 40 of FIG. 2.

The third shield layer 150 can be electrically coupled to the cooling element 136 such that the third shield layer can provide an electrode or contact for current source 138 that provides bias current $I_B$ through the cooling element. In other words, the third shield layer 150 acts as an electrode for cooling element 136. In one or more embodiments, the current source 138 is electrically coupled to the second shield layer 124 to provide another electrode for the cooling element 136. Alternatively, in one or more embodiments, separate electrode layers can be disposed between the second shield layer 124 and the cooling element 136 and/or between the cooling element and the third shield layer 50 to electrically couple the current source 138 to the cooling element.

Figure 6:
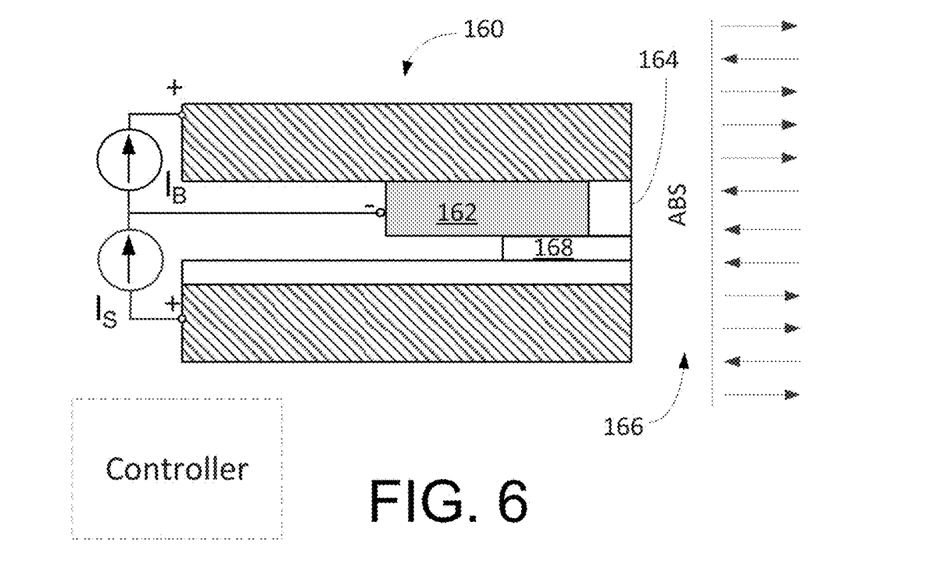
FIG. 6 is a schematic cross-section view of another embodiment of a magnetic stack.

As mentioned herein, the cooling elements of the present disclosure can be disposed in any suitable location relative to a magnetically responsive lamination such that the cooling element can cool the lamination. For example, FIG. 6 is a schematic cross-section view of another embodiment of a magnetic stack 160. All of the design considerations and possibilities regarding the magnetic stack 40 of FIG. 2 apply equally to the magnetic stack 160 of FIG. 6. One difference between the magnetic stack 160 and the magnetic stack 40 is that the cooling element 162 is positioned such that electrically insulating material 164 is disposed between the cooling element and ABS 166. Although not wishing to be bound by any particular theory, providing insulating material 164 between the cooling element 162 and the ABS 166 may help electrically shield magnetically responsive lamination 168 from noise that may be created by current that is directed through the cooling element. The insulating material 164 can include any suitable material or combination of materials and include any suitable dimensions.

Figure 7:
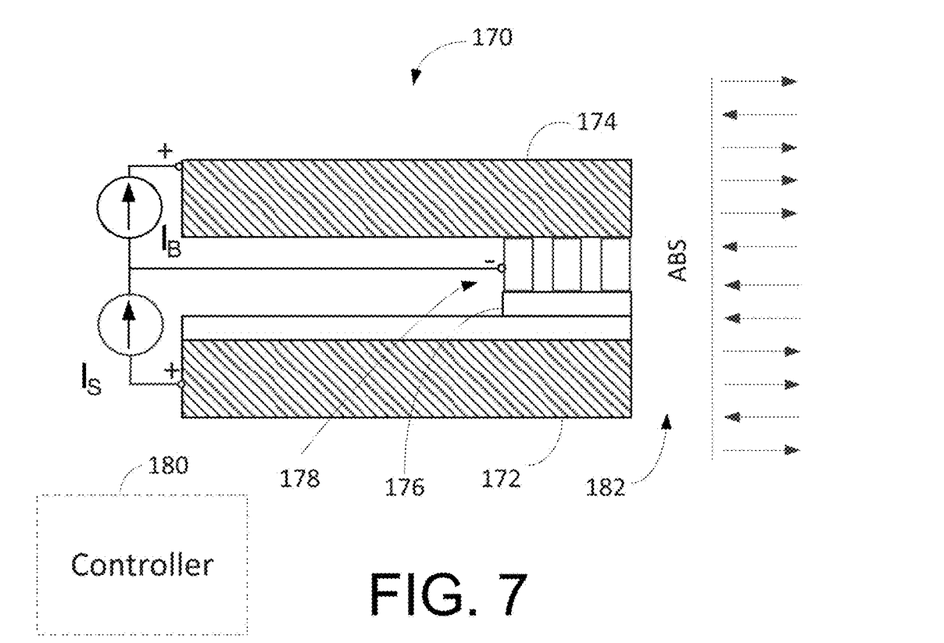
FIG. 7 is a schematic cross-section view of another embodiment of a magnetic stack.

Although stack 40 of FIG. 2 includes a single cooling element 56, in one or more embodiments, the stack can include two or more cooling elements. For example, FIG. 7 is a schematic cross-section view of one embodiment of a magnetic stack 170. All of the design considerations and possibilities regarding the magnetic stack 40 of FIG. 2 apply equally to magnetic stack 170 of FIG. 7. One difference between magnetic stack 170 and magnetic stack 40 is that stack 170 includes an array of cooling elements 178 disposed between first and second shield layers 172, 174. As illustrated in FIG. 7, the array of cooling elements 178 is thermally coupled to magnetically responsive lamination 176 and is configured to receive a bias current $I_B$ (not shown) therethrough. The array of cooling elements 178 is also configured to cool the magnetically responsive lamination 176.

The array of cooling elements 178 can include any suitable number of cooling elements. Further, the array of cooling elements 178 can include any suitable cooling element or elements. The individual elements of the array of cooling elements 178 can be electrically connected in any suitable manner, e.g., in serial or parallel configurations. In one or more embodiments, the individual elements of the array of cooling elements 178 can be independently controllable using any suitable technique or combination of techniques. For example, a controller 180 can be utilized to independently control one or more of the individual elements of the array of cooling elements 178. In one or more embodiments, independently controllable elements of the array of cooling elements 178 can provide selected cooling zones for the magnetically responsive lamination 176.

The cooling elements of the array of cooling elements 178 can be configured in any suitable configuration or array. In one or more embodiments, the cooling elements of the array of cooling elements 178 can be configured such that each cooling element lies in a plane that is substantially parallel to a plane that contains the second shield layer 174. Further, each cooling element of the array of cooling elements 178 can be oriented in any suitable position. For example, in one or more embodiments, one or more cooling elements can be configured and oriented such that the bias current $I_B$ flows through the element in a direction substantially parallel to an air bearing surface (ABS) 182 of the stack 170. Alternatively, in one or more embodiments, one or more cooling elements can be configured and oriented such that the bias current $I_B$ flows through the element in a direction substantially transverse to the ABS 182.

In general, the magnetic stacks of the present disclosure can be manufactured using any suitable technique or combination of techniques, e.g., sputter deposition, chemical vapor deposition, epitaxial deposition, etc. In one or more embodiments, the magnetic stack can be vertically integrated. Such vertically integrated stacks can be manufactured using any suitable technique or combination of techniques, e.g., sputter deposition, chemical vapor deposition, epitaxial deposition, etc.

Figure 8:
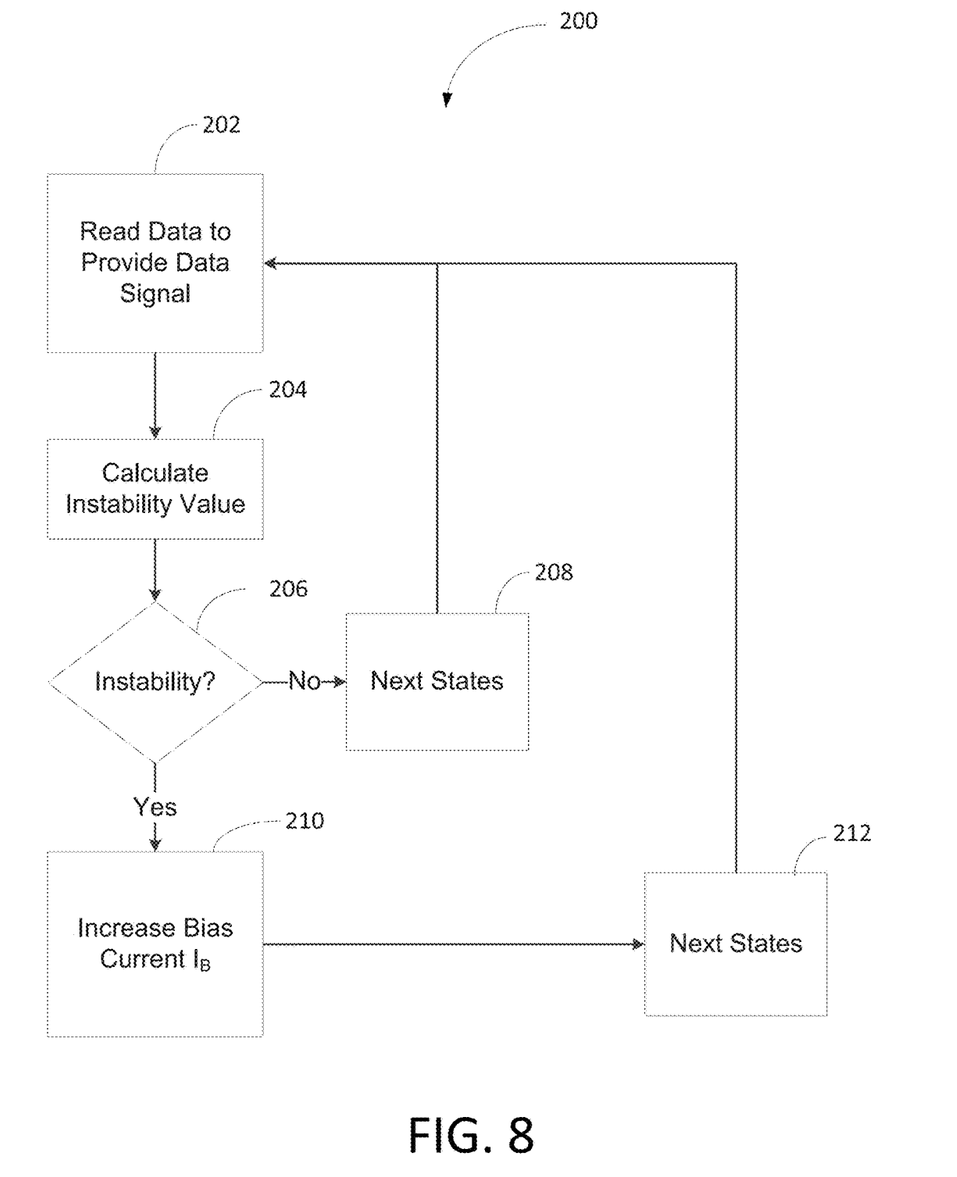
FIG. 8 is a flow diagram of one embodiment of a method of cooling a magnetically responsive lamination of a magnetic stack.

Any suitable technique or combination of techniques can be utilized to control the cooling elements of the present disclosure. For example, FIG. 8 is a flow diagram of one embodiment of a method 200 of controlling a cooling element of a magnetic stack (e.g., stack 40 of FIG. 2). The stack can be utilized, e.g., as a read element of a head of a storage device (e.g., device 10 of FIG. 1). In general, an instability value of a head of a storage device can be determined or calculated based on any suitable data signal of the device. For example, a selected data pattern stored on a storage medium of a storage device can be read to provide a data signal from which an instability value (e.g., thermal instability value) can be calculated. This instability value can be compared to an instability threshold, and a bias current $I_B$ can be applied to the cooling element (e.g., cooling element 56 of FIG. 2) if the instability value is greater than an instability threshold.

Specifically, in reference to magnetic stack 40 of FIG. 2, the cooling element 56 can be controlled by reading a selected data pattern to provide a data signal 202. Such data pattern can be stored or written on a suitable media e.g. magnetic storage media 20 of FIG. 1. Any suitable data pattern can be written to a storage medium.

The selected pattern can be read from the storage medium using the head to provide the data signal 202. Any suitable technique or combination of techniques can be used to read the selected pattern. For example, in one or more embodiments, reading the selected pattern can include multiple revolutions and senses of the pattern (e.g., about 20 senses, about 30 senses, about 40 senses, etc.), and each of the senses can be averaged to provide the data signal. In one or more embodiments, the selected pattern can be read for a selected number of reads over a selected time period. The selected number of reads can be between about 25 reads to about 500 reads. In one or more embodiments, the selected number of reads can be greater than or equal to about 25 reads, about 40 reads, about 50 reads, about 60 reads, about 70 reads, about 80 reads, about 90 reads, about 100 reads, about 125 reads, about 150 reads, about 200 reads, about 250 reads, etc. In one or more embodiments, the selected number of reads can be less than or equal to about 500 reads, about 400 reads, about 300 reads, about 250 reads, about 200 reads, about 175 reads, about 150 reads, about 125 reads, about 100 reads, about 90 reads, about 75 reads, about 50 reads, etc.

Additionally, the selected number of reads may be described based on a rate. In one or more embodiments, the selected pattern can be read between about 1 time per minute to about 100 times per minute. In one or more embodiments, the pattern may be read greater than or equal to about 1 time per minute, about 2 times per minute, about 3 times per minute, about 5 times per minute, about 10 times per minute, about 15 times per minute, about 20 times per minute, about 30 times per minute, about 40 times per minute, about 50 times per minute, about 60 times per minute, etc. In one or more embodiments, the selected pattern can be read less than or equal to about 100 times per minute, about 90 times per minute, about 80 times per minute, about 70 times per minute, about 60 times per minute, about 50 times per minute, about 40 times per minute, about 30 times per minute, about 25 times per minute, about 20 times per minute, about 15 times per minute, etc.

An instability value 204 of the head is calculated based on the data signal 202. The instability value 204 can be calculated using any suitable technique or combination of techniques. For example, in one or more embodiments, a bit error rate of the data signal can be determined to provide an instability value. Any suitable technique or combination of techniques can be used to determine the bit error rate of the data signal.

In one or more embodiments, an instability value 204 of the entire storage device can be calculated. In one or more alternative embodiments, an instability value 204 for each head of the storage device can be calculated. For example, because the characteristics (e.g., thermal characteristics) of each head may be unique, for devices that include two or more heads (e.g., one head per storage medium for devices that include two or more storage media, multiple heads for each storage medium, etc.), an instability value 204 for each head can be calculated.

The instability value 204 can be compared to an instability threshold 206. Any suitable instability threshold 206 can be utilized. In one or more embodiments, the instability threshold can include a standard deviation of the bit error rate (BER) of the device.

If the instability value 206 of the head of the device is equal to or less than the desired instability threshold 204, then testing proceeds to any desired additional testing or functioning states at 208, e.g., the device or system can perform further testing or can end testing and begin typical read/write routines or functions for reading and/or writing data to and from a storage medium. If, however, the instability value 204 is greater than the desired instability threshold 206, then a bias current $I_B$ 210 provided to the cooling element 56 that is thermally coupled to the magnetically responsive lamination 46 can be applied. The method can proceed to any suitable next states 212, e.g., further testing 202 or typical read/write functions. In one or more embodiments, if the instability value 204 continues to exceed the desired instability threshold 206, then the bias current $I_B$ 210 can be increased. Further, in one or more embodiments, if the instability value 204 is less than the desired instability threshold 206 while the bias current $I_B$ is being provided to the cooling element 56, then the bias current $I_B$ can be decreased to a desired level.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A magnetic stack, comprising:
   first and second shield layers;
   a magnetically responsive lamination disposed between the first and second shield layers and configured to receive a sense current $I_S$ therethrough;
   an array of cooling elements thermally coupled to the magnetically responsive lamination, wherein the array of cooling elements is configured to receive a bias current $I_B$ therethrough, and further wherein the array of cooling elements is configured to cool the magnetically responsive lamination; and
   a first current source electrically coupled to the magnetically responsive lamination to provide $I_S$ and a second current source electrically coupled to the array of cooling elements to provide $I_B$.

2. The magnetic stack of claim 1, wherein each cooling element of the array of cooling elements is independently controllable.

3. The magnetic stack of claim 1, wherein the array of cooling elements is in contact with the magnetically responsive lamination.

4. The magnetic stack of claim 1, wherein the array of cooling elements is thermally coupled to the second shield layer.

5. The magnetic stack of claim 1, further comprising insulating material disposed between the array of cooling elements and an air bearing surface (ABS) of the magnetic stack.

6. The magnetic stack of claim 1, wherein the array of cooling elements comprises a Peltier cooling element.

7. The magnetic stack of claim 1, wherein each cooling element of the array of cooling elements comprises a semiconductor material.

8. The magnetic stack of claim 1, wherein the array of cooling elements is disposed between the magnetically responsive lamination and the second shield layer.

9. The magnetic stack of claim 1, further comprising a controller operable to control $I_B$.

10. The magnetic stack of claim 1, further comprising a third shield layer disposed such that the array of cooling elements is between the third shield layer and the second shield layer, wherein the third shield layer is magnetically coupled to the second shield layer and electrically coupled to the array of cooling elements.

11. The magnetic stack of claim 1, wherein the magnetically responsive lamination comprises a ferromagnetic free layer, a synthetic antiferromagnetic (SAF) structure, and a spacer layer positioned between the ferromagnetic free layer and the SAF structure.

12. The magnetic stack of claim 1, further comprising an antiferromagnetic (AFM) structure disposed between the first shield layer and the magnetically responsive lamination and magnetically coupled to the magnetically responsive lamination.

13. A data storage device comprising the magnetic stack of claim 1.

14. A magnetic stack, comprising:
   first and second shield layers;
   a magnetically responsive lamination disposed between the first and second shield layers and configured to receive a sense current $I_S$ therethrough;
   a cooling element disposed between the first and second shield layers and thermally coupled to the magnetically responsive lamination, wherein the cooling element is configured to receive a bias current $I_B$ therethrough, and further wherein the cooling element is configured to cool the magnetically responsive lamination during a read function;
   a third shield layer disposed such that the cooling element is between the third shield layer and the second shield layer, wherein the third shield layer is magnetically coupled to the second shield layer and electrically coupled to the cooling element; and
   a first current source electrically coupled to the magnetically responsive lamination to provide $I_S$ and a second current source electrically coupled to the cooling element to provide $I_B$.

15. The magnetic stack of claim 14, wherein the cooling element comprises a Peltier cooling element.

16. The magnetic stack of claim 14, further comprising insulating material disposed between the cooling element and an air bearing surface (ABS) of the magnetic stack.

17. A magnetic stack, comprising:
   first and second shield layers;
   a magnetically responsive lamination disposed between the first and second shield layers and configured to receive a sense current $I_S$ therethrough; and
   an array of cooling elements thermally coupled to the magnetically responsive lamination, wherein the array of cooling elements is configured to receive a bias current $I_B$ therethrough, wherein the array of cooling elements is configured to cool the magnetically responsive lamination, and further wherein each cooling element of the array of cooling elements is independently controllable.

* * * * *